(12) United States Patent
Heinzl et al.

(10) Patent No.: US 9,298,770 B2
(45) Date of Patent: Mar. 29, 2016

(54) GENERATING REMOTELY ACCESSIBLE REPOSITORIES FROM LANGUAGE META-MODELS

(75) Inventors: Steffen Heinzl, Fulda (DE); Anis Charfi, Darmstadt (DE); Benjamin Schmeling, Seeheim-Jungenheim (DE); Heiko Witteborg, Griesheim (DE)

(73) Assignee: SAP SE, Walldorf (DE)

(*) Notice: Subject to any disclaimer, the term of this patent is extended or adjusted under 35 U.S.C. 154(b) by 541 days.

(21) Appl. No.: 13/328,672

(22) Filed: Dec. 16, 2011

(65) Prior Publication Data

US 2013/0159354 A1 Jun. 20, 2013

(51) Int. Cl.
*G06F 17/30* (2006.01)
*G06F 7/00* (2006.01)

(52) U.S. Cl.
CPC .... *G06F 17/30448* (2013.01); *G06F 17/30294* (2013.01); *G06F 17/30371* (2013.01)

(58) Field of Classification Search
USPC ......................................................... 707/804
See application file for complete search history.

(56) References Cited

U.S. PATENT DOCUMENTS

| | | | |
|---|---|---|---|
| 2002/0046294 A1* | 4/2002 | Brodsky | G06F 9/541 709/246 |
| 2005/0154976 A1* | 7/2005 | Nelson | 715/513 |
| 2009/0007061 A1* | 1/2009 | Ben-Zvi et al. | 717/105 |
| 2009/0132562 A1* | 5/2009 | Mehr et al. | 707/100 |

OTHER PUBLICATIONS

SAP, "Unified Service Description Language (USDL)," Mar. 17, 2011, 40 pages.
OMG, "Business Process Model and Notation (BPMN)," Version 2.0, Jan. 2011, 538 pages.
W3C Note, "Web Services Description Language WSDL) 1.1," Mar. 15 2001, retrieved from http://www.w3.org/TR/wsdl, 31 pages.
Eclipse, "Eclipse Modeling Framework Project (EMF)," 2012, retrieved on Oct. 25, 2012 from http://www.eclipse.org/modeling/emf/, 3 pages.
Eclipse, "Teneo," May 2012, retrieved on Jul. 10, 2012 from http://wiki.eclipse.org/Teneo, 3 pages.
Eclipse, "Eclipse Modeling Framework Technology (EMFT)," 2012, retrieved on Jul. 10, 2012 from http://www.eclipse.org/modeling/emft/?project=teneo, 6 pages.
Hibernate, "Relational Persistence for Java and .NET," retrieved on Oct. 25, 2012 from http://www.hibernate.org/, 3 pages.
Eclipse, "EclipseLink Project," 2012, retrieved on Oct. 25, 2012 from http://www.eclipse.org/eclipselink/, 2 pages.
Jersey, JAX-RS (JSR 311), retrieved on Jul. 10, 2012 from http://jersey.java.net/, 2 pages.
HSQLDB, "HSQLDB—100% Java Database," Jul. 2012, retrieved on Jul. 10, 2012 from http://hsqldb.org/, 2 pages.
AndroMDA, "Generate components quickly with AndroMDA," 2012, retrieved on Jul. 10, 2012 from http://www.andromda.org/docs/index.html, 3 pages.

(Continued)

*Primary Examiner* — Kimberly Wilson
(74) *Attorney, Agent, or Firm* — Fish & Richardson P.C.

(57) ABSTRACT

Implementations of the present disclosure include methods, systems, and computer-readable storage mediums for generating a repository comprising receiving a language meta-model; receiving annotations, each annotation including meta-data; annotating the language meta-model based on the annotations to provide an annotated language meta-model; and generating one or more repository modules based on the annotated language meta-model, the repository being defined based on the one or more repository modules.

17 Claims, 3 Drawing Sheets

(56) References Cited

OTHER PUBLICATIONS

Fornax-Platform, "The Fornax-Platform," retrieved on Jul. 10, 2012 from http://www.fornax-platform.org/, 1 page.

Springsource, "Spring Projects: Spring Roo," 2012, retrieved on Jul. 10, 2012 from http://www.springsource.org/spring-roo, 7 pages.

Eclipse, "CDO," Nov. 2011, retrieved on Jul. 10, 2012 from http://wiki.eclipse.org/CDO, 2 pages.

Druid, "Welcome to Druid: The Database Manager," 2005, retrieved on Jul. 10, 2012 from http://druid.sourceforge.net/, 1 page.

Object Generation, "HiberObjects," 2011, retrieved on Jul. 10, 2012 from http://objectgeneration.com/eclipse/index.html, 3 pages.

Visual Paradigm, "Visual Paradigm for UML 10.0 Standard Edition," 2012, retrieved on Jul. 10, 2012 from http://www.visual-paradigm.com/product/vpuml/editions/standard.jsp, 3 pages.

* cited by examiner

GENERATING REMOTELY ACCESSIBLE REPOSITORIES FROM LANGUAGE META-MODELS

BACKGROUND

A computer processable language ("language") can be associated with an underlying language meta-model. The underlying language meta-model defines the concepts and rules of the language—for example, the syntax of the language. An instance of the language meta-model can yield a concrete model of the language. A repository can be provided that stores artifacts of the language based on the language meta-model.

SUMMARY

Implementations of the present disclosure include computer-implemented methods including the actions of generating a repository. The method comprises receiving a language meta-model; receiving annotations, each annotation including meta-data; annotating the language meta-model based on the annotations to provide an annotated language meta-model; and generating one or more repository modules based on the annotated language meta-model, the repository being defined based on the one or more repository modules.

The implementation can optionally include one or more of the follow features. For instance, the method further comprises transforming the language meta-model from a first data structure to a second data structure; transforming occurs prior to annotating; o the first data structure comprises a graph structure and the second data structure comprises a tree structure. Additionally, the method can include that the one or more repository modules comprise one or more of a data model module, a data access object (DAO) module, a service module and a web service module; generating the one or more repository modules comprises processing the annotated language meta-model using respective generators, each generator generating a repository module of the one or more repository modules; and the one or more repository modules provide one or more functions comprising persisting an instance of a model within the repository, searching instances of models within the repository, updating an instance of a model in the repository, retrieving an instance of a model from the repository, enabling concurrent access to an instance of a model within the repository, and enabling version management between instances of a model within the repository. Another example can include the method further comprising receiving a configuration, the configuration defining one or more functions to be provided by the repository modules, wherein the one or more repository modules are generated further based on the configuration. Further, the language meta-model is associated with one of a Unified Service Description Language (USDL), a Web Services Description Language (WSDL), a Unified Modeling Language (UML), a Business Process Model and Notation (BPMN) language, a workflow language, and a specification language.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
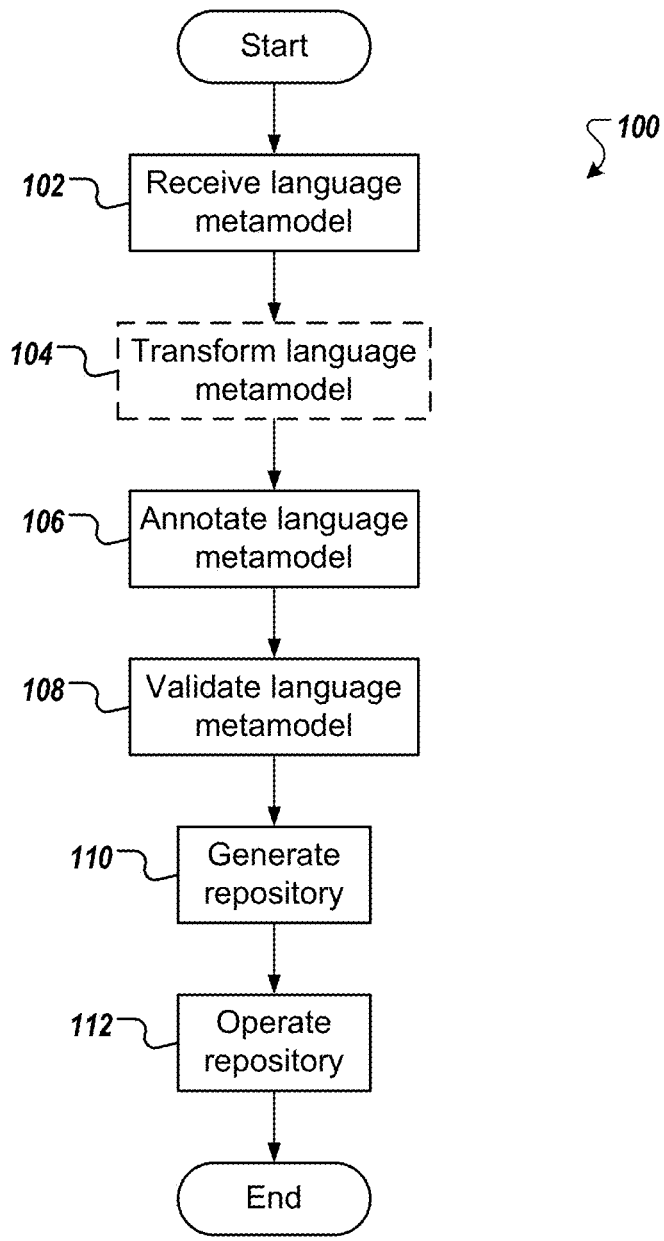
FIG. 1 is a flowchart depicting an example process that can be executed in accordance with implementations of the present disclosure.

Implementations of the present disclosure are generally directed to repository generation for a computer processable language. Specifically, as a language meta-model changes—for example, when a new version of the language is developed—the implementation of the repository that stores artifacts defined by the language meta-model is also changed. In some examples, each change of the language meta-model affects the implementation, and in particular, the modules of the repository. Accordingly, a model-based repository generation method and system can generate the repository and the corresponding repository modules based on the updates to the language meta-model.

In some implementations, the model-based repository generation system receives the language meta-model and annotations to the language meta-model. In some examples, each annotation includes meta-data of the language meta-model. The system annotates the language meta-model based on the annotations to provide an annotated language meta-model. The system generates one or more repository modules based on the annotated language meta-model, with the repository being defined based on the one or more repository modules. In some implementations, the system transforms the received language meta-model from a first data structure to a second data structure prior to the system annotating the language meta-model, with the system annotating the transformed language meta-model to provide the annotated language meta-model.

In some examples, the language meta-model can include a language meta-model for which a repository has not been previously generated. In some examples, the language meta-model can include an updated language meta-model for which a repository has been previously generated. In either example, the received language meta-model includes formalization of concepts, interrelations, and constraints of the language. Further, the language meta-model describes the rules for the syntax of the language. In some implementations, the language meta-model is associated with a modeling language. Example modeling languages can include the Unified Modeling Language (UML), the Business Process Model and Notation (BPMN) language, service description languages (e.g., Web Services Description Language (WSDL) and Unified Service Description Language (USDL)), workflow languages (e.g., Business Process Execution Language (BPEL) and XML Process Definition Language (XPDL)), and specification languages (e.g., Z and petri nets).

In some implementations, the received language meta-model can be transformed. In some examples, the received language meta-model includes a first data structure, and can be transformed to a second data structure. The repository can be generated based on the second data structure. In some examples, transformation of the language meta-model can depend on a technical infrastructure the language is operated on, for example, the technical infrastructure that operates on the second data structure of the language meta-model. Example transformations can include concept renaming, concept restructuring, and new concept and interrelation introduction. In some implementations, the first data structure can include a graph data structure and the second data structure can include a tree data structure. In some examples, transformation of the graph data structure of the language meta-model to a tree data structure can include providing a root node for the language meta-model such that all other concepts—for example, nodes—of the language meta-model are connected to the root node. In some implementations, the received language meta-model can be transformed prior to annotating the language meta-model.

In some examples, the received language meta-model is annotated. In some examples, the transformed language meta-model is annotated. In some implementations, annotating the language meta-model—either the received language meta-model or the transformed language meta-model—can be used to map the language meta-model on the technical infrastructure the language is operated on. In other words, annotations of the language meta-model can provide a framework, that is, which concepts of the language meta-model are mapped and in which way with respect to the infrastructure the language is operated on. For example, concepts that are defined as classes in the language meta-model can become objects in the instances of the language meta-model. These objects can be used as maps to relational concepts in a database storing the instance of the language meta-model of the system. In some examples, the type of annotations can depend on the application of the language meta-model and the infrastructure the language is operated on. In some implementations, annotations can be arbitrary key value pairs which add meta-data to the language meta-model.

In some implementations, the annotated language meta-model can be validated. In some examples, it can be determined whether the annotated language meta-model adheres to the meta-model framework. The meta-model framework is the layer that describes concepts from which the meta-model is defined from. For example, the syntax of the annotated language meta-model can be validated against the syntax of the meta-model framework. In some examples, validation of the annotated language meta-model can also include determining whether the annotations of the annotated language meta-model are accurate with respect to the infrastructure that the language meta-model is operated on. In some implementations, the received language meta-model can also be validated upon reception.

The repository can be generated and can include one or more modules that define the repository. The repository modules can be based on the annotated language meta-model. In some examples, generation of the repository modules includes generation of the language code that defines the modules of the repository. In some implementations, the repository modules that are generated are dependent upon desired functionalities of the repository. The desired functionalities can be stored, accessed, or both by module generators, discussed in further detail below. In some implementations, a configuration can be received and can define one or more functions that are to be provided by the repository modules. Accordingly, the module generators can generate the repository modules based on the configuration.

In some examples, the repository modules can include a data model module, a data access object (DAO) module, a service module, and a web service module. In some implementations, generation of the repository includes processing the annotated language meta-model using the module generators. Specifically, each module generator can generate the language code that defines a respective module (e.g., generate the language code of the data model module, the DAO module, the service module, and the web service module).

Furthermore, with respect to the generation of the repository modules, a data model generator generates, for each class in the language meta-model, a class in the language of the repository. A DAO generator generates, for each class in the language meta-model, a data access object class that enables writing/updating/deleting of objects of the class to and reading from the database. A service generator generates, for each concept in the language meta-model, a service that offers a transaction context for the generated DAOs. Specifically, by generating the DAOs and the services, a layered architecture is provided. Further, the generated services provide a transactional context when accessing the database. In some implementations, the generated services can provide fine-grained access to the database. In the example of web services, a web service generator generates operations such as create, read, updated, and delete (CRUD) operations for the root node of the language meta-model. Generation of the CRUD operations helps creation of new instances of the language meta-model, updating existing instances of the language meta-model, deleting instances of the language meta-model, and retrieving instances of the language meta-model.

The repository modules can provide additional functionality to the repository. For example, one or more of the repository modules can persist instances of the language meta-model within the database. In some implementations, the instances of the language meta-model are persisted in a structured format in the database. Functions can include one or more repository modules searching instances of language meta-models within the database. Functions can include one or more repository modules storing, updating, and retrieving an instance of the language meta-model. In some implementations, storing, updating, and retrieving can be initialized remotely, for example, from the Internet. Functions can include one or more repository modules automatically updating an underlying schema of the database. Functions can include one or more repository modules exposing services in a self-describing format.

Functions can also include repository federation by the one or more repository modules. In some examples, the one or more repositories can distribute repository content. Functions can include one or more repository modules facilitating object-based access control. Functions can include one or more repository modules enabling concurrent access management. Functions can include one or more repository modules enabling version management between instances of the language meta-model within the database. In some examples, enabling version management can include storing all changes to the instance of the language meta-model. In other words, version management can include the ability to retrieve previous version of the instance of the language meta-model.

Functions can include one or more repository modules facilitating fine-grained object access. In some examples, each concept of the metamodel can have an associated table and structure such that fine-grained object access is provided to the objects. For example, when attributes of an object are to be changed (e.g., when attributes are added or removed from the descriptions of the object) object access is provided. Thus, with fine-grained object access, only the particular object is updated. This provides advantages such as improved performance (e.g., only the particular object is accessed).

Other advantages include concurrent access of objects (e.g., only relevant parts of the object are accessed and thus, other parts remain accessible. In some implementations, the functions provided by the one or more repository modules are independent of the language of the annotated language meta-model.

After generation of the repository, the repository can be operated. Specifically, the repository is operated using the generated repository modules.

FIG. 1 is a flowchart depicting an example process 100 that can be executed in accordance with implementations of the present disclosure. The example process 100 can be executed using one or more computing devices.

The language meta-model is received (102). In some examples, a language meta-model for which a repository has not been previously generated can be received. In some examples, an updated language meta-model for which a repository has been previously generated can be received. In some examples, the received language meta-model is transformed (104). It is appreciated that transformation can be optional. In some examples, a first data structure of the received language meta-model can be transformed to a second data structure. The language meta-model is annotated (106). In some examples, the received language meta-model is annotated. In some examples, the transformed language meta-model is annotated. Annotating the language meta-model—either the received language meta-model or the transformed language meta-model—can be used to map the language meta-model on the infrastructure the language meta-model is operated on. The annotated language meta-model is validated (108). In some examples, validation can include determining whether the annotated language meta-model adheres to the meta-model framework. The repository is generated based on the annotated language meta-model (110). Specifically, the modules that define the repository are generated. In some examples, generation of the repository modules includes generation of language code that defines the modules of the repository, wherein the repository operates using the generated modules. The repository is operated (112).

Figure 2:
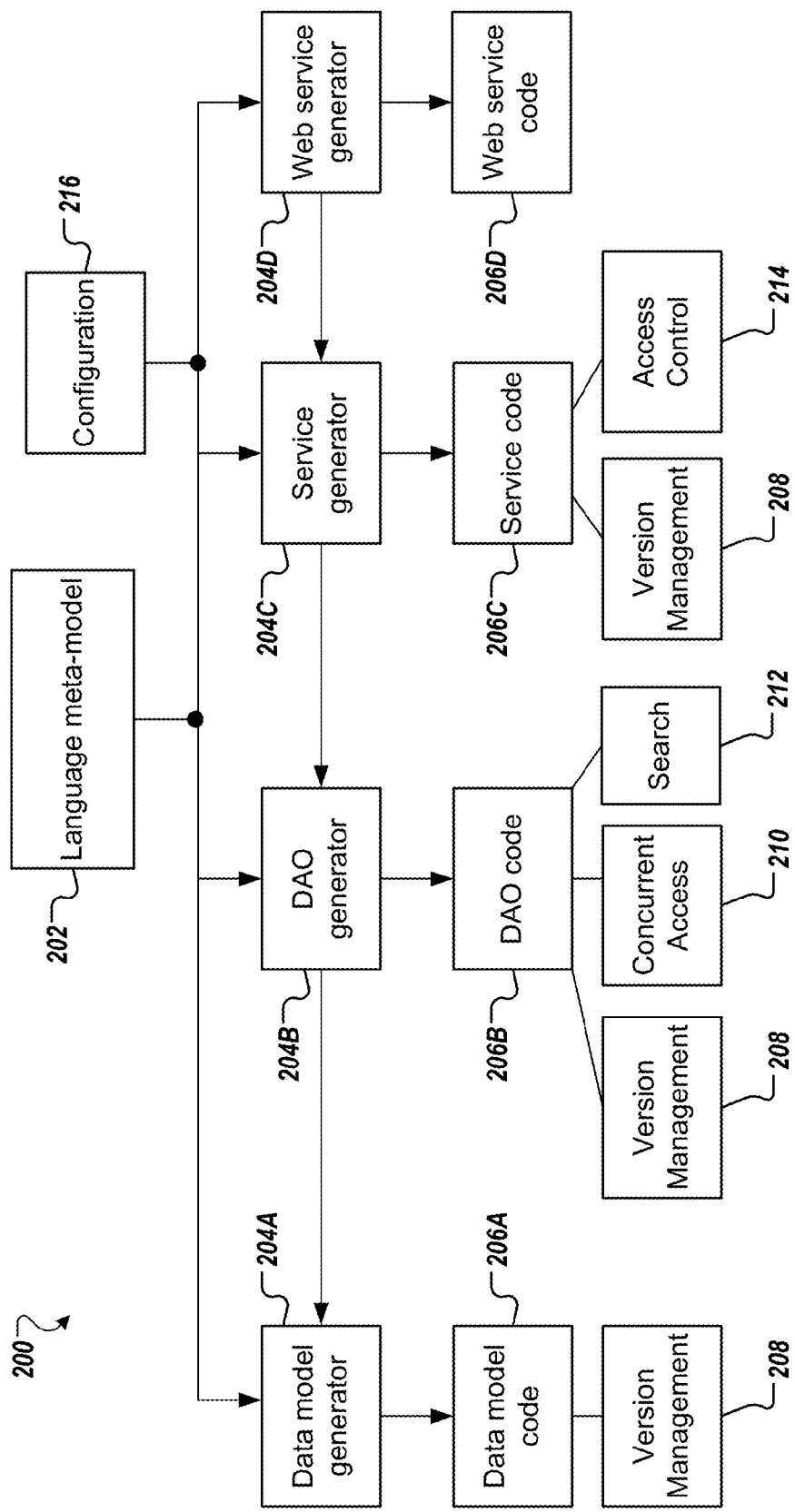
FIG. 2 is a block diagram of depicting generation of example repository modules.

FIG. 2 is a block diagram 200 depicting generation of example repository modules. As mentioned above, the repository modules can be generated based on the language meta-model 202. The language meta-model 202 is provided to generators 204A-204D that process the language meta-model to generate repository modules 206A-206D, respectively. In some examples, each of the generators 204A-204D can be provided as one or more computer-executable programs. In some examples, each of the repository modules 206A-206D are provided as computer-executable program code and/or programs. The data model generator 204A generates the data model code module 206A; the DAO generator 204B generates the DAO module 206B; the service code generator 204C generates the service code module 206C; and the web service generator 204D generates the web service module 206D. The repository modules 206A-206D provide at least the functions discussed above. Further, in some implementations, specific repository modules 206A-206D can implement specific functions. For example, the data model code module 206A, the DAO module 206B, and the service code module 206C implement the version management function 208; the DAO module 206B implements the concurrent access function 210 and the search function 212; and the service code module 206C implements the access control function 214. In some implementations, any of the repository modules 206A-206D can implement any of the functions.

In some implementations, the generators 204A-204D receive a configuration 216 that defines the functions that are to be provided by the repository modules 206A-206D. In some examples, the configuration 216 can be provided as computer-readable code that describes what repository modules 206A-206D are to be generated, and what functions the respective repository modules 206A-206D are to perform.

Additionally, the repository modules 206A-206D can depend on one another. In some examples, one or more of the repository modules 206A-206D can utilize the code of one or more of the other repository modules 206A-206D. In the depicted example, the DAO code module 206B is dependent on the data model code module 206A and thus, the DAO code module 206B uses the code of the data model code module 206A. Further, in the depicted example, the service code module 206C is dependent on the DAO code module 206B and thus, the service code module 206C uses the code of the DAO code module 206B and of the data model code module 206A. Also, in the depicted example, the web service code module 206D is dependent on the service code module 206C and thus, the web service code module 206D uses the code of the service code module 206C, the DAO code module 206B, and the data model code module 206A.

By way of non-limiting example, the USDL language can be considered. Specifically, the USDL language meta-model is received. In some examples, the USDL language meta-model includes multiple classes and interrelations between the classes. In some examples, the USDL language meta-model is expressed with/in Ecore. The received USDL language meta-modal can be transformed. In some examples, the USDL language meta-model can be transformed to a technical meta-model, for example, a tree-based language meta-model such as XML. As a result of the transformation, a root class can be added to the language meta-model. In some examples, the root class includes all classes that are not contained in any other class as a result of the syntax of the transformed language meta-model being tree-based.

The transformed USDL language meta-model is annotated. In some examples, an ID attribute including Teneo—a model relational mapper—annotations is added to every class that does not include a superclass. The ID provided in the ID attribute can be used as a primary key in the database for each persisted object. The values of the Teneo annotations can be used by an underlying Java Persistence Application programming interface (JPA) implementation—for example, Hibernate or EclipseLink. In some examples, the transformed USDL language meta-model is annotated with additional Ecore annotations to help configuration of the repository module generators. For example, annotations can include instructions to the DAO generator to generate additional methods for particular classes.

Continuing with the above example, the annotated USDL language meta-model can be validated against the Ecore meta-model. If the annotated USDL language meta-model is valid, the repository is generated. The generators are employed to generate the repository modules. In some examples, the generators can be written in the Xpand language. In some examples, the DAO generator generates stateless session beans (i.e., Java classes with Java EE 6 annotations). In some examples, the service generator generates stateless session beans that are annotated with the Java EE 6 transaction annotations. The transaction annotations relay to the application server describing for which methods a transactional context is needed. The transaction-handling services offer a set of methods (e.g., create, update, getAll, find, remove) that, for example, use the methods of the DAO generator to create, update, find or remove the object(s) from the database.

Continuing with the above example, the web service generator generates RESTful services (i.e., services conforming to Representational State Transfer (REST) architecture style) for the root elements of the USDL language meta-model (e.g., a "ServiceDescription" element). In some examples, when generating the RESTful services, the Jersey framework is used. The generated Java class is annotated with the path that corresponds to the root element. For each of the four primitives—GET, POST, DELETE, PUT—a method is generated with corresponding annotations for the primitives, the path and the media/mime types.

The generated repository can be operated. In some examples, at runtime, a Persistence Provider can read the Ecore packages used and, based on this reading, initialize the data store. In some examples, Hyper Structured Query Language Database (HSQLDB) can be used. In some examples, other databases can be employed that are compatible with Hibernate or EclipseLink. From all of the generated parts, a Java enterprise application is provided that can be deployed to an application server. In some examples, the enterprise application is deployed to a JBoss application server.

Figure 3:
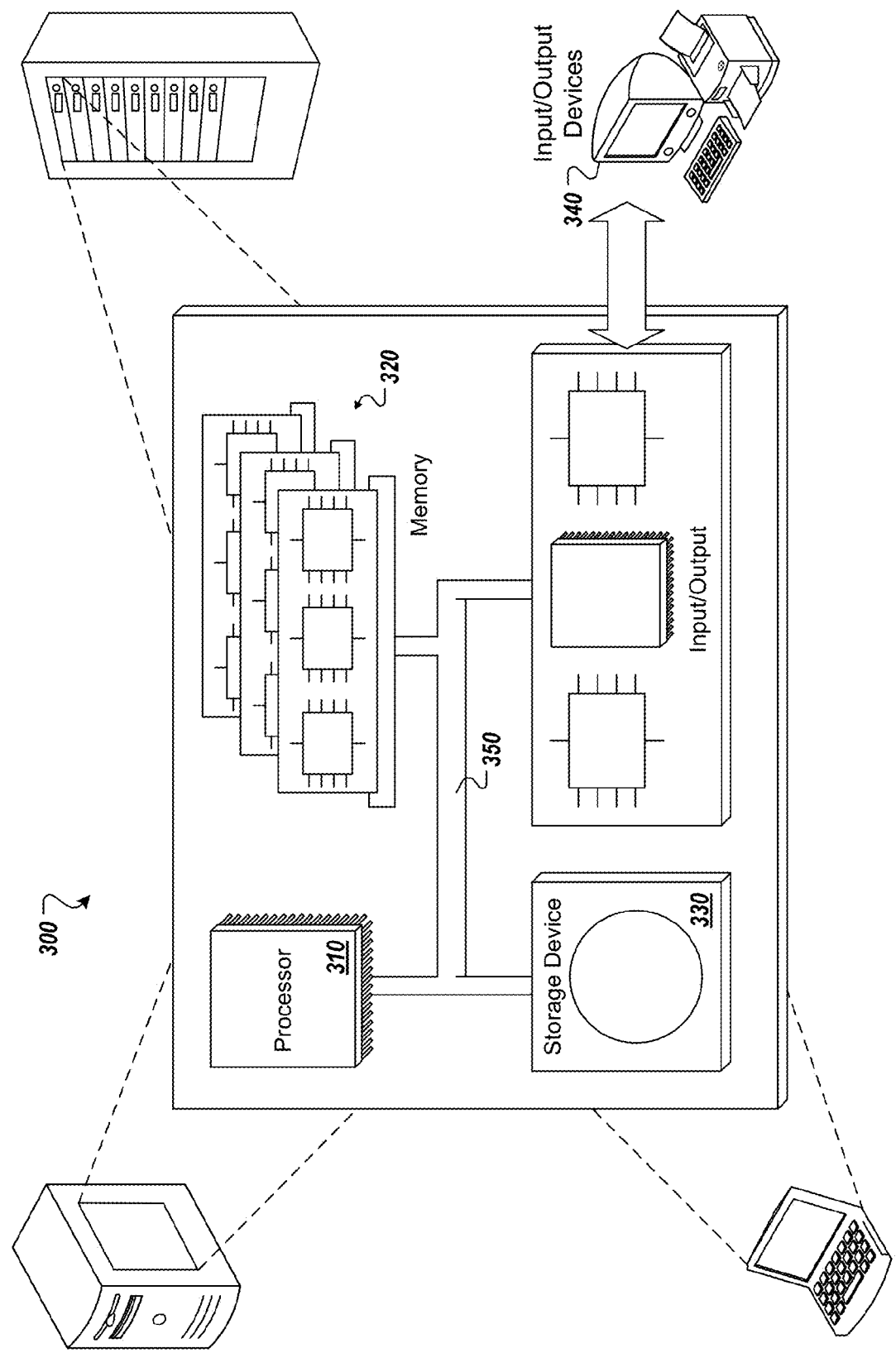
FIG. 3 is a schematic illustration of example computer systems that can be used to execute implementations of the present disclosure.

Referring now to FIG. 3, a schematic diagram of an example computing system 300 is provided. The system 300 can be used for the operations described in association with the implementations described herein. For example, the system 300 can be included in any or all of the server components discussed herein. The system 300 includes a processor 310, a memory 320, a storage device 330, and an input/output device 340. Each of the components 310, 320, 330, and 340 are interconnected using a system bus 350. The processor 310 is capable of processing instructions for execution within the system 300. In one implementation, the processor 310 is a single-threaded processor. In another implementation, the processor 310 is a multi-threaded processor. The processor 310 is capable of processing instructions stored in the memory 320 or on the storage device 330 to display graphical information for a user interface on the input/output device 340.

The memory 320 stores information within the system 300. In one implementation, the memory 320 is a computer-readable medium. In one implementation, the memory 320 is a volatile memory unit. In another implementation, the memory 320 is a non-volatile memory unit. The storage device 330 is capable of providing mass storage for the system 300. In one implementation, the storage device 330 is a computer-readable medium. In various different implementations, the storage device 330 can be a floppy disk device, a hard disk device, an optical disk device, or a tape device. The input/output device 340 provides input/output operations for the system 300. In one implementation, the input/output device 340 includes a keyboard and/or pointing device. In another implementation, the input/output device 340 includes a display unit for displaying graphical user interfaces. In another implementations, the input/out device 340 includes a touch interface.

The features described can be implemented in digital electronic circuitry, or in computer hardware, firmware, software, or in combinations of them. The apparatus can be implemented in a computer program product tangibly embodied in an information carrier, for example, in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube), a LCD (liquid crystal display) monitor, or a plasma display for displaying information to the user and a keyboard and a pointing device such as a mouse, a trackball, or a touch display by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other implementations are within the scope of the following claims.

A number of implementations of the present disclosure have been described. Nevertheless, it will be understood that various modifications can be made without departing from the spirit and scope of the present disclosure. Accordingly, other implementations are within the scope of the following claims.

What is claimed is:

1. A computer-implemented method for generating a repository, the method comprising:
   receiving a language meta-model to provide a received language meta-model;
   receiving annotations, each annotation including metadata;
   annotating the received language meta-model based on the annotations to provide an annotated language meta-model;
   determining that a repository has not been previously generated that is associated with the received language meta-model, and in response, processing the annotated language meta-model using a first and a second generator to generate a first and a second repository module, respectively;
   identifying a dependency of the first repository module on the second repository module; and
   based on the identified dependency, providing, by the first repository module, one or more functions based on i) the first generator and ii) the second repository module.

2. The method of claim 1, further comprising transforming the received language meta-model from a first data structure to a second data structure.

3. The method of claim 2, wherein transforming occurs prior to annotating.

4. The method of claim 2, wherein the first data structure comprises a graph structure and the second data structure comprises a tree structure.

5. The method of claim 1, wherein the first and the second repository module comprises one or more of a data model module, a data access object (DAO) module, a service module and a web service module.

6. The method of claim 1, wherein the one or more functions comprise persisting an instance of a model within the repository, searching instances of models within the repository, updating an instance of a model in the repository, retrieving an instance of a model from the repository, enabling concurrent access to an instance of a model within the repository, and enabling version management between instances of a model within the repository.

7. The method of claim 1, further comprising receiving a configuration, the configuration defining the one or more functions to be provided by the first repository module, wherein the first repository module is generated further based on the configuration.

8. The method of claim 1, wherein the language meta-model is associated with one of a Unified Service Description Language (USDL), a Web Services Description Language (WSDL), a Unified Modeling Language (UML), a Business Process Model and Notation (BPMN) language, a workflow language, and a specification language.

9. A non-transitory computer-readable storage medium coupled to one or more processors and having instructions stored thereon which, when executed by the one or more processors, cause the one or more processors to perform operations for generating a repository, the operations comprising:
   receiving a language meta-model to provide a received language meta-model;
   receiving annotations, each annotation including metadata;
   annotating the received language meta-model based on the annotations to provide an annotated language meta-model;
   determining that a repository has not been previously generated that is associated with the received language meta-model, and in response, processing the annotated language meta-model using a first and a second generator to generate a first and a second repository module, respectively;
   identifying a dependency of the first repository module on the second repository module; and
   based on the identified dependency, providing, by the first repository module, one or more functions based on i) the first generator and ii) the second repository module.

10. The non-transitory computer-readable storage medium of claim 9, the operations further comprising transforming the received language meta-model from a first data structure to a second data structure.

11. The non-transitory computer-readable storage medium of claim 10, wherein the operation of transforming occurs prior to annotating.

12. The non-transitory computer-readable storage medium of claim 10, wherein the first data structure comprises a graph structure and the second data structure comprises a tree structure.

13. The non-transitory computer-readable storage medium of claim 9, wherein the first and the second repository module comprises one or more of a data model module, a data access object (DAO) module, a service module and a web service module.

14. The non-transitory computer-readable storage medium of claim 9, the operations further comprising receiving a configuration, the configuration defining the one or more functions to be provided by the first repository module, wherein the first repository module is generated further based on the configuration.

15. A system, comprising:
   a computing device; and
   a computer-readable storage device coupled to the computing device and having instructions stored thereon which, when executed by the computing device, cause the computing device to perform operations generating a repository, the operations comprising:
      receiving a language meta-model to provide a received language meta-model;
      receiving annotations, each annotation including metadata;
      annotating the received language meta-model based on the annotations to provide an annotated language meta-model;
      determining that a repository has not been previously generated that is associated with the received language meta-model, and in response, processing the annotated language meta-model using a first and a second generator to generate a first and a second repository module, respectively;

identifying a dependency of the first repository module on the second repository module; and based on the identified dependency, providing, by the first repository module, one or more functions based on i) the first generator and ii) the second repository module.

16. The system of claim 15, wherein the first and the second repository module comprises one or more of a data model module, a data access object (DAO) module, a service module and a web service module.

17. The system of claim 15, the operations further comprising receiving a configuration, the configuration defining the one or more functions to be provided by the first repository module, wherein the first repository module is generated further based on the configuration.

\* \* \* \* \*